United States Patent [19]

Mockovciak, Jr.

[11] Patent Number: 5,158,248

[45] Date of Patent: Oct. 27, 1992

[54] MODULAR EARTH-RETURN SPACE VEHICLE

[75] Inventor: John Mockovciak, Jr., Pearland, Tex.

[73] Assignee: Grumman Aerospace Corporation, Bethpage, N.Y.

[21] Appl. No.: 580,580

[22] Filed: Sep. 11, 1990

[51] Int. Cl.$^5$ ............................................... B64G 1/62
[52] U.S. Cl. ..................................... 244/160; 244/161
[58] Field of Search ............... 244/158 R, 158 A, 160, 244/161

[56] References Cited

U.S. PATENT DOCUMENTS

| | | | |
|---|---|---|---|
| 3,508,723 | 4/1970 | Warren et al. | 244/161 |
| 3,547,376 | 12/1970 | Van Alstyne et al. | 244/162 |
| 3,576,298 | 4/1971 | Barnett et al. | 244/162 |
| 3,606,212 | 9/1971 | Bradley et al. | 244/160 |
| 4,240,601 | 12/1980 | Reed | 244/160 |
| 4,395,004 | 7/1983 | Ganssle et al. | 244/160 |
| 4,557,444 | 12/1985 | Jackson et al. | 244/158 A |
| 4,880,187 | 11/1989 | Rourke et al. | 244/158 R |

*Primary Examiner*—Joseph F. Peters, Jr.
*Assistant Examiner*—Virna Lissi Mojica
*Attorney, Agent, or Firm*—Pollock, VandeSande & Priddy

[57] ABSTRACT

A re-entry vehicle that includes three detachable modular components which anticipate total re-useability. Modularization of the composite re-entry vehicle offers great flexibility in re-arranging the various modules to suit a particular mission. The three module components include a crew module, principally serving as a crew cabin, and attached thereto is a modular heat shield or re-entry module which principally provides for thermal protection of the cabin module during re-entry. Propulsion for the cabin module to achieve a particular re-entry orbit is provided by a versatile service stage which becomes detached from the other two modules upon attainment of a desired re-entry trajectory. When used in conjunction with a Space Station, the versatile service stage may be propelled back to the Space Station for refueling and re-use.

3 Claims, 1 Drawing Sheet

MODULAR EARTH-RETURN SPACE VEHICLE

FIELD OF THE INVENTION

The present invention relates to space vehicles, and more particularly to a space vehicle capable of returning an astronaut crew to Earth from space.

BACKGROUND OF THE INVENTION

The traditional space re-entry vehicle for astronauts includes two principal components. The first component was a re-entry vehicle of the Gemini or Apollo types which included an astronaut cabin and heat shield section which protected the cabin from high temperatures encountered during re-entry. Detachable propulsion units were attached to such re-entry vehicles so as to obtain a correct re-entry trajectory. After such a trajectory was obtained, the propulsion package would separate. This type of traditional space vehicle had a fixed design based upon a particular planned re-entry along a prescribed trajectory.

With the progression of space travel, plans are now underway for the construction of large Space Stations where astronauts will live and work for protracted periods of time. Although regular shuttle travel between Earth and a Space Station will be possible with vehicles such as the Space Shuttle, a need exists for enabling emergency escape by a Space Station crew to Earth.

It has been conceived that a traditional type of re-entry vehicle could be employed which includes a propulsion unit and a crew cabin. However, it would be highly desirable if a re-entry vehicle could be adaptable for a host of other tasks from the Space Station, other than emergency escape and return to Earth.

BRIEF DESCRIPTION OF THE INVENTION

The present invention utilizes three basic components of a re-entry vehicle but presents an immense improvement by modularizing these components; namely, a crew module, a re-entry module, and a versatile service stage (VSS). The crew module basically serves as the crew cabin while the re-entry module provides a heat shield for the crew module when the latter enters the Earth's atmosphere. Finally, the VSS provides the propulsion for moving the entire re-entry vehicle from a Space Station and imparting the declerative propulsion to place the vehicle on a re-entry trajectory to the Earth.

The improvement of the present invention is the modularization of these three components thereby permitting simple replacement and reuse of the individual components as becomes necessary. Thus, if a re-entry module suffers extensive heat damage during re-entry, only that module need be replaced quickly and relatively inexpensively, as opposed to replacing or completing extensive repairs on an entire re-entry vehicle including the crew cabin portion.

The modularized approach of the present invention also enables different re-entry module shapes to be employed with a re-entry vehicle. Thus, a re-entry module of a particular geometric configuration may be used for Earth atmosphere re-entry; but where travel between an Earth-orbiting Space Station and a geosynchronous orbit is desirable, a second type of re-entry module in the form of an atmospheric drag brake may be used. The ability to employ a different type of re-entry module shape, depending upon a particular mission, gives the present invention great flexibility as opposed to re-entry vehicles that have a fixed thermal shield geometry.

A further advantage of the modular approach is the flexibility of interchanging individual modules at an Earth-orbiting Space Station. For example, if work must be done in the immediate vicinity of a Space Station, a crew module may be uncoupled from the remaining modules; and with the assistance of auxiliary propulsion means, including possible variants of the VSS, a crew may be able to quickly and easily move from point to point.

A still further advantage of the present invention is the flexible propulsion characteristics designed into the main propulsion system, namely the VSS, with the ability to return to an Earth-orbiting Space Station after guiding the remaining crew and re-entry modules to an Earth re-entry trajectory. In this manner, by appropriate propulsion system sizing, the same VSS may be re-used to maneuver a number of emergency return re-entry vehicles docked to the Space Station, thereby eliminating the necessity of including a separate propulsion system in each re-entry vehicle. In fact, the modular construction of the present invention embodies the concept of reusability for all modules.

The present invention is intended to be compatible with plans for Space Station construction and projected future propulsion vehicles. Thus, it could maximize the use of projected propulsion programs and Space Station hardware to provide significant program cost savings and scheduling efficiencies.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
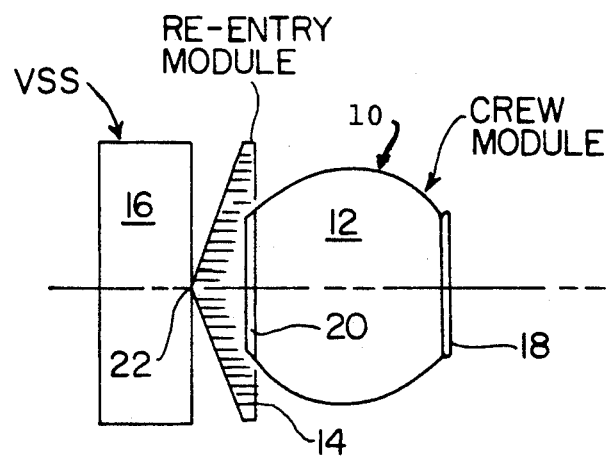
FIG. 1 is a diagrammatic view of the individual modular components comprising the present invention.

Referring to FIG. 1, the present invention is diagrammatically illustrated as a combined re-entry vehicle generally indicated by reference numeral 10. The vehicle is comprised of three separate modules. The first module is a crew module 12 which serves as a pressurized crew cabin. The crew module 12 is connected to a re-entry module 14 which acts as a thermal shield during re-entry of the crew module 12. Propulsion of the crew module and re-entry module, from a Space Station to an Earth-bound trajectory is accomplished by a versatile service stage (VSS) 16, which also contains the appropriate guidance, navigation, and control to inject the crew and re-entry modules into the desired re-entry trajectory. The VSS then separates from the re-entry and crew modules at an appropriate time and returns to the Space Station. The separation of a propulsion unit from a crew module is, of course, old in the art. However, the modularization of the three outlined units, in combination with the versatile propulsion characteristics of the VSS, represents the distinction of the present invention.

Typically, the entrance port 18 of the crew module is suitably attached to an exit port of a Space Station. This allows immediate access of a crew for an emergency separation from the Space Station. Typically, the crew module includes environmental control and crew survival gear, as well as self-contained power sources and system controls and displays. Communication equipment is also on board the crew module. The design of a crew cabin with the aforementioned equipment represents prior art and is not, per se, the present invention. Rather, it is to be emphasized that the present invention is directed to the modularization of a crew module for attachment to a re-entry module and a VSS, as will now be discussed.

An end 20 opposite the entry port 18 of the crew module is a latching mechanism which connects the crew module 12 with a modular thermal shield, hereinafter referred to as a re-entry module 14. The re-entry module, of course, provides thermal protection for a crew by employing high-temperature materials well known in the art. In addition, the internal volume of the re-entry module may include a landing recovery system and a small propulsion system for vernier attitude control during re-entry, the latter systems being well known in the art. Basically, the re-entry module is constructed in a conical or sphericalshaped manner, the precise geometry of the member depending upon the type of flight anticipated by a re-entry vehicle. For example, a first type of known geometry may be employed when re-entry to the Earth from a Space Station is anticipated. However, if the assembled re-entry vehicle is intended to transport a crew to make repairs to communication satellites in geosynchronous orbit with the Earth, the re-entry module shape can be geometrically designed to enable its use as a lifting brake for atmospheric braking, for manned missions returning from geosynchronous orbit. The tremendous advantage of the present invention is the ability for the re-entry module to be changed depending upon specific needs.

In order for the crew module and re-entry module to successfully land on Earth, it is necessary to provide it with a propulsion unit which takes the form of the present VSS module. The propulsion unit includes individual components which are prior art but, in accordance with this invention, present the advantage of being modular. FIG. 1 illustrates the re-entry module 14 as being connected to the VSS module 16 at the interface surface shown as point 22. The connection would be by means of conventional latching mechanisms which enable precise unlatching of the VSS at a computed instant following achievement of a predetermined re-entry trajectory toward Earth. After the re-entry trajectory is initiated, the VSS would be separated from the re-entry module, and returned to the Space Station for refueling and reuse.

It should be mentioned that the latching mechanisms for maintaining the VSS 16 and the crew module 12 to the re-entry module 14 may be those conventionally used in separation stages of rockets as well as other latching mechanisms for space vehicles.

Figure 2:
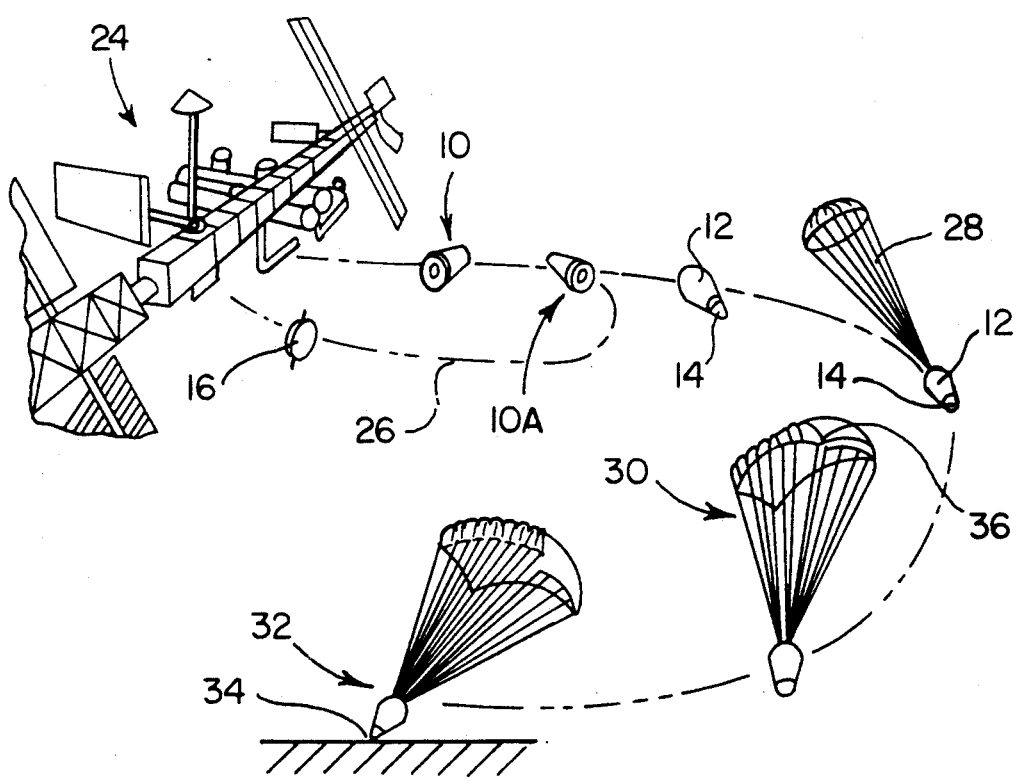
FIG. 2 is a diagrammatic illustration of a crew module re-entry accompanied by return of a versatile service stage to a Space Station.

FIG. 2 illustrates one aspect of utility of the present invention, wherein a VSS 16 remains attached to an assembled re-entry vehicle until such point as an Earth return trajectory is obtained, at which point it separates and returns to the Space Station for refueling and re-use. FIG. 2 basically illustrates an operational sequence for landing a crew module. The operational sequence assumes the existence of a Space Station 24 wherein a complete re-entry vehicle 10, comprised of all three modules, is launched from the Space Station. This, of course, could occur if an emergency escape is necessary or if a crew is to be returned to Earth in a preplanned manner. The existence of the VSS module enables the re-entry vehicle to follow a predetermined path wherein the re-entry vehicle may begin an Earth-bound trajectory in a stabilized attitude as indicated by reference numeral 10A. When this occurs, the VSS 16 separates from the re-entry module 14 for return to the Space Station (26) where it may be refueled and re-used. At this point in the operational sequence, the crew module 12 and attached re-entry module 14 descend toward Earth. At an appropriate time when the crew module 12 has been properly oriented and stabilized for re-entry, a drogue chute 28 may be deployed from the crew module in a manner well known to those in the art. The remaining basic operational sequence steps include the deployment of main chute 36 at descent point 30. The final landing of the crew module (and attached re-entry module) is indicated at reference numeral 32. Typically, this is a splash-down entry into water 34 but a dry landing is also possible. The parachute deployment and landing apparatus constitutes prior art design and is not, per se, part of the present invention. However, by virtue of the present invention, different re-entry modules may be positioned on the re-entry vehicle at the Space Station in accordance with different anticipated usage conditions. By virtue of modularizing the re-entry vehicle in its three principal components, total re-useability of each module is anticipated thereby greatly expediting availability of hardware as well as minimizing costs.

It should be understood that the invention is not limited to the exact details of construction shown and described herein for obvious modifications will occur to persons skilled in the art.

I claim:

1. A method for providing a flexible modular re-entry vehicle operating with an Earth-orbiting Space Station, comprising the following steps:

securing a crew module to the Space Station thereby providing access to the module;

externally attaching an interchangeable thermal protection module to the crew module for protecting the crew module during re-entry to the Earth's atmosphere;

externally attaching a replaceable propulsion module to the thermal protection module;

releasing the three attached modules from the Space Station;

operating the propulsion module thereby moving the vehicle from the Space Station;

separating the propulsion module from the thermal protection module;

establishing an Earth-bound trajectory for the remaining attached crew and thermal protection modules; and returning the propulsion module to the Space Station free of the crew module.

2. The method set forth in claim 1 together with the step of refueling the propulsion module for re-use.

3. The method set forth in claim 1 wherein the thermal protection module chosen for use has a preselected geometry for achieving predetermined flight characteristics.

* * * * *